(12) United States Patent
Feldermann et al.

(10) Patent No.: US 9,034,966 B2
(45) Date of Patent: May 19, 2015

(54) FLAME RETARDANT POLYCARBONATE COMPOSITIONS

(75) Inventors: Achim Feldermann, Düsseldorf (DE); Dieter Wittmann, Leverkusen (DE)

(73) Assignee: Bayer Materialscience AG, Leverkusen (DE)

( * ) Notice: Subject to any disclaimer, the term of this patent is extended or adjusted under 35 U.S.C. 154(b) by 76 days.

(21) Appl. No.: 13/081,038

(22) Filed: Apr. 6, 2011

(65) Prior Publication Data

US 2011/0251316 A1 Oct. 13, 2011

(30) Foreign Application Priority Data

Apr. 7, 2010 (DE) .......................... 10 2010 013 991

(51) Int. Cl.
| | |
|---|---|
| *C08K 3/32* | (2006.01) |
| *C08L 55/02* | (2006.01) |
| *C08L 69/00* | (2006.01) |
| C08K 5/5313 | (2006.01) |
| C08L 51/00 | (2006.01) |
| C08L 67/04 | (2006.01) |

(52) U.S. Cl.
CPC . *C08K 3/32* (2013.01); *C08L 55/02* (2013.01); C08K 5/5313 (2013.01); C08L 51/00 (2013.01); C08L 67/04 (2013.01); *C08L 69/00* (2013.01); C08L 2205/03 (2013.01)

(58) Field of Classification Search
CPC ......... C08L 55/02; C08L 67/04; C08L 69/00; C08K 3/32
USPC .......... 524/414; 525/410, 411, 413, 415, 450, 525/185
See application file for complete search history.

(56) References Cited

U.S. PATENT DOCUMENTS

| | | | | |
|---|---|---|---|---|
| 2008/0262151 A1* | 10/2008 | Ishii et al. | ...................... | 524/599 |
| 2009/0209695 A1 | 8/2009 | Yu et al. | | |
| 2009/0215945 A1 | 8/2009 | Moulinie et al. | | |

FOREIGN PATENT DOCUMENTS

| | | | | |
|---|---|---|---|---|
| DE | 10 2007 061 76 | | 6/2009 | |
| EP | 1 792 941 A1 | | 6/2007 | |
| JP | 2009-079218 | * | 4/2009 | .............. C08L 77/00 |
| WO | 2006/030951 | | 3/2006 | |

OTHER PUBLICATIONS

Written Opinion and International Search Report dated Jul. 7, 2011 issued in corresponding International Application No. PCT/EP2011/055155.

* cited by examiner

*Primary Examiner* — Robert Jones, Jr.
(74) *Attorney, Agent, or Firm* — Miles & Stockbridge P.C.

(57) ABSTRACT

The present invention relates to impact-modified polylactic acid/polycarbonate compositions, containing
  A) 48 to 90 parts by weight, based in each case on the sum of the parts by weight of components A+B+C+D, of aromatic polycarbonate,
  B) 1 to 40 parts by weight, based in each case on the sum of the parts by weight of components A+B+C+D, of polylactic acid,
  C) 0.5 to 15 parts by weight, based in each case on the sum of the parts by weight of components A+B+C+D, of graft polymer,
  D) 2 to 25 parts by weight, based in each case on the sum of the parts by weight of components A+B+C+D, of a salt of a phosphinic acid and
  optionally additional components such as vinyl polymers and additives,
which are distinguished by an optimum combination of high heat resistance, good flame retardance and excellent mechanical properties, to the use of the polycarbonate compositions for the production of mouldings and the mouldings themselves.

17 Claims, No Drawings

FLAME RETARDANT POLYCARBONATE COMPOSITIONS

CROSS REFERENCE TO RELATED APPLICATIONS

This application claims priority to DE 10 2010 013 991.2 filed Apr. 7, 2010, the content of which is incorporated herein by reference in its entirety.

BACKGROUND

1. Field of the Invention

The present invention relates to flame retardant, impact-modified polycarbonate/polylactic acid compositions which contain a salt of a phosphinic acid and exhibit improved heat resistance, toughness and flame resistance, and to the use of the flame retardant, impact-modified polycarbonate/polylactic acid compositions for the production of mouldings and the mouldings themselves.

2. Description of Related Art

WO-A 2006/030951 A1 discloses compositions containing 95-5 wt. % polylactic acid (PLA) and 5-95 wt. % aromatic polycarbonate, based in each case on the sum of the two components, an acrylic resin or a styrene-grafted acrylic resin, another polymer grafted or copolymerised with a glycidyl component and at least one compatibilising agent from the group of the oxazolines, oxazines and carbodiimides.

DE-A 10 2007 061 760 discloses impact-modified polyalkylene terephthalate/polycarbonate compositions which contain a salt of a phosphinic acid, the use of the impact-modified polyalkylene terephthalate/polycarbonate compositions for the production of mouldings and the mouldings themselves.

While plastics are increasingly replacing metals and wood in many areas of technology and everyday life, and work is being carried out intensively on improving their properties and opening up new areas of application, however, a large proportion of these plastics are based on non-renewable raw materials such as petroleum, stocks of which are limited.

In the past few years, therefore, on the one hand processes for the recycling of plastics and on the other hand plastics based on renewable raw materials, e.g. polylactic acid (PLA), have been developed. One problem with this, however, is that often these plastics do not yet achieve the specifications and properties of the established materials.

Thus, for example, it is known that with PC/PLA (polycarbonate/polylactic acid) blends, improved flame resistance can be achieved by adding phosphate-containing flame retardants. However, these flame retardant blends generally display low heat resistance and reduced toughness, which is inadequate for the desired areas of application.

SUMMARY OF THE INVENTION

An object of the present invention is therefore to provide impact-modified polycarbonate/polylactic acid compositions with an optimum combination of good flame retardance together with high heat resistance and excellent mechanical properties, in particular high stress cracking resistance and notched impact strength.

Surprisingly, it has now been found that the compositions or moulding compositions comprising A) polycarbonate, B) polylactic acid, C) rubber-modified graft polymer and D) a salt of a phosphinic acid, in particular calcium phosphinate, as flame retardants lead to blends with significantly improved flame retardant properties, high heat resistance, high stress cracking resistance and high notched impact strength.

Compositions of the present invention can comprise

A) 40 to 90 parts by weight, preferably 50 to 75 parts by weight, particularly preferably 54 to 72 parts by weight (based in each case on the sum of the parts by weight of components A+B+C+D) of aromatic polycarbonate, B) 1 to 40 parts by weight, preferably 5 to 30.0 parts by weight, more preferably 10 to 28 parts by weight and particularly preferably 15 to 25 parts by weight (based in each case on the sum of the parts by weight of components A+B+C+D) of polylactic acid, C) 0.5 to 15 parts by weight, preferably 3 to 11 parts by weight, particularly preferably 5 to 9 parts by weight (based in each case on the sum of the parts by weight of components A+B+C+D) of graft polymer, D) 2 to 25 parts by weight, preferably 5.0 to 17.5 parts by weight, particularly preferably 7.5 to 15 parts by weight (based in each case on the sum of the parts by weight of components A+B+C+D) of a salt of a phosphinic acid, E) 0 to 10 parts by weight, preferably 0.5 to 5 parts by weight (based on the sum of the parts by weight of components A+B+C+D=100) of vinyl (co)polymer, F) 0 to 50 parts by weight, preferably 0.5 to 25.0 parts by weight, particularly preferably 0.7 to 5.0 (based in each case on the sum of the parts by weight of components A+B+C+D=100) of additives, all parts by weight data in the present application being standardised such that the sum of the parts by weight of components A+B+C+D in the composition adds up to 100.

DETAILED DESCRIPTION OF A PREFERRED EMBODIMENT

Component A

As component A) the compositions according to the present invention contain a polycarbonate or a mixture of polycarbonates.

Preferred polycarbonates are those homopolycarbonates and copolycarbonates based on the bisphenols of the general formula (I),

$$HO—Z—OH \quad (I)$$

where Z is a divalent organic residue with 6 to 30 C atoms, which contains one or more aromatic groups.

Preference is given to bisphenols of formula (Ia)

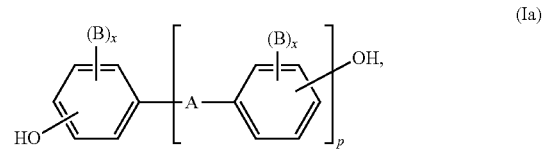

wherein

A is a single bond, $C_1$-$C_5$ alkylene, $C_2$-$C_5$ alkylidene, $C_5$-$C_6$ cycloalkylidene, —O—, —SO—, —CO—, —S—, —SO$_2$—, $C_6$-$C_{12}$ arylene, on which other aromatic rings optionally containing hetero atoms may be condensed, or a residue of formula (II) or (III)

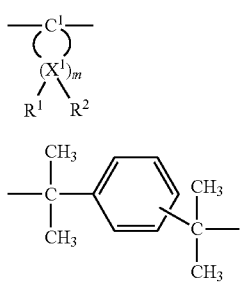

B is in each case $C_1$-$C_{12}$ alkyl, preferably methyl, halogen, preferably chlorine and/or bromine, x independently of one another in each case is 0, 1 or 2, p is 1 or 0, and $R^1$ and $R^2$ can be selected for each $X^1$ individually and, independently of one another, denote hydrogen or $C_1$-$C_6$ alkyl, preferably hydrogen, methyl or ethyl, $X^1$ denotes carbon and m denotes an integer from 4 to 7, preferably 4 or 5, with the proviso that on at least one $X^1$ atom, $R^1$ and $R^2$ are simultaneously alkyl.

Examples of bisphenols according to the general formula (I) are bisphenols which belong to the following groups: dihydroxydiphenyls, bis(hydroxyphenyl)alkanes, bis(hydroxyphenyl)cycloalkanes, indane bisphenols, bis(hydroxyphenyl)sulfides, bis(hydroxyphenyl)ethers, bis(hydroxyphenyl)ketones, bis(hydroxyphenyl)sulfones, bis(hydroxyphenyl)sulfoxides and α,α'-bis(hydroxyphenyl)diisopropylbenzenes.

Derivatives of the above bisphenols, which are obtainable e.g. by alkylation or halogenation on the aromatic rings of the above bisphenols, are also examples of bisphenols according to general formula (I).

Examples of bisphenols according to general formula (I) are in particular the following compounds: hydroquinone, resorcinol, 4,4'-dihydroxydiphenyl, bis(4-hydroxyphenyl)sulfide, bis(4-hydroxyphenyl)sulfone, bis(3,5-dimethyl-4-hydroxyphenyl)methane, bis(3,5-dimethyl-4-hydroxyphenyl)sulfone, 1,1-bis(3,5-dimethyl-4-hydroxyphenyl)-p/m-diisopropylbenzene, 1,1-bis(4-hydroxyphenyl)-1-phenylethane, 1,1-bis(3,5-dimethyl-4-hydroxyphenyl)cyclohexane, 1,1-bis(4-hydroxyphenyl)-3-methylcyclohexane, 1,1-bis(4-hydroxyphenyl)-3,3-dimethylcyclohexane, 1,1-bis(4-hydroxyphenyl)-4-methylcyclohexane, 1,1-bis(4-hydroxyphenyl)cyclohexane, 1,1-bis(4-hydroxyphenyl)-3,3,5-trimethylcyclohexane, 2,2-bis(3,5-dichloro-4-hydroxyphenyl)propane, 2,2-bis(3-methyl-4-hydroxyphenyl)propane, 2,2-bis(3,5-dimethyl-4-hydroxyphenyl)propane, 2,2-bis(4-hydroxyphenyl)propane (i.e. bisphenol A), 2,2-bis(3-chloro-4-hydroxyphenyl)propane, 2,2-bis(3,5-dibromo-4-hydroxyphenyl)propane, 2,4-bis(4-hydroxyphenyl)-2-methylbutane, 2,4-bis(3,5-dimethyl-4-hydroxyphenyl)-2-methylbutane, α,α'-bis(4-hydroxyphenyl)-o-diisopropylbenzene, α,α'-bis(4-hydroxyphenyl)-m-diisopropylbenzene (i.e. bisphenol M), α,α'-bis(4-hydroxyphenyl)-p-diisopropylbenzene and indane bisphenol.

Particularly preferred polycarbonates are the homopolycarbonate based on bisphenol A, the homopolycarbonate based on 1,1-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane.

The bisphenols described according to general formula (I) can be produced by known methods, e.g. from the corresponding phenols and ketones.

The above bisphenols and methods for their production are described for example in the monograph H. Schnell, "Chemistry and Physics of Polycarbonates", Polymer Reviews, vol. 9, pp. 77-98, Interscience Publishers, New York, London, Sidney, 1964 and in U.S. Pat. Nos. 3,028,635, 3,062,781, 2,999,835, 3,148,172, 2,991,273, 3,271,367, 4,982,014, 2,999,846, in DE-A 1 570 703, in DE-A 2 063 050, in DE-A 2 036 052, in DE-A 2 211 956, in DE-A 3 832 396 and in FR-A 1 561 518 and in the Japanese published patent applications with the application numbers JP-A 62039 1986, JP-A 62040 1986 and JP-A 105550 1986.

1,1-Bis(4-hydroxyphenyl)-3,3,5-trimethylcyclohexane and the production thereof are described e.g. in U.S. Pat. No. 4,982,014.

Indane bisphenols and the production thereof are described e.g. in U.S. Pat. No. 3,288,864, in JP-A 60 035 150 and in U.S. Pat. No. 4,334,106. Indane bisphenols can be produced for example from isopropenyl phenol or its derivatives or from dimers of isopropenyl phenol or its derivatives in the presence of a Friedel-Craft catalyst in organic solvents.

Polycarbonates can be produced by known methods. Suitable methods for the production of polycarbonates are, for example, production from bisphenols with phosgene by the interfacial polycondensation process or from bisphenols with phosgene by the homogeneous phase process, the so-called pyridine process, or from bisphenols with carbonates by the melt transesterification process. These production methods are described e.g. in H. Schnell, "Chemistry and Physics of Polycarbonates", Polymer Reviews, vol. 9, pp. 31-76, Interscience Publishers, New York, London, Sidney, 1964. The aforementioned production methods are also described in D. Freitag, U. Grigo, P. R. Müller, H. Nouvertne, "Polycarbonates" in Encyclopedia of Polymer Science and Engineering, Volume 11, Second Edition, 1988, pages 648 to 718 and in U. Grigo, K. Kircher and P. R. Müller "Polycarbonate" in Becker, Braun, Kunststoff-Handbuch, vol. 3/1, Polycarbonate, Polyacetale, Polyester, Celluloseester, Carl Hanser Verlag Munich, Vienna 1992, pages 117 to 299 and in D. C. Prevorsek, B. T. Debona and Y. Kesten, Corporate Research Center, Allied Chemical Corporation, Morristown, N.J. 07960, "Synthesis of Poly(estercarbonate) Copolymers" in Journal of Polymer Science, Polymer Chemistry Edition, Vol. 19, 75-90 (1980).

The melt transesterification process is described in particular for example in H. Schnell, "Chemistry and Physics of Polycarbonates", Polymer Reviews, vol. 9, pp. 44 to 51, Interscience Publishers, New York, London, Sidney, 1964 and in DE-A 1 031 512.

In the production of polycarbonate, raw materials and auxiliary substances with a low level of impurities are preferably used. In particular for production by the melt transesterification process the bisphenols used and the carbonic acid derivatives used should, as far as possible, be free from alkali ions and alkaline earth ions. Such pure raw materials can be obtained, for example, by recrystallising, washing or distilling the carbonic acid derivatives, e.g. carbonates, and the bisphenols.

The polycarbonates that are suitable according to the present invention preferably have a weight average molecular weight ($M;\_w$), which can be determined e.g. by ultracentrifugation or scattered light measurement, of 10 000 to 200 000 g/mol. They particularly preferably have a weight average molecular weight of 12 000 to 80 000 g/mol, more particularly preferably 20 000 to 35 000 g/mol.

The average molecular weight of the polycarbonates according to the present invention can be adjusted in a known manner for example by an appropriate amount of chain terminators. The chain terminators can be used individually or as a mixture of various chain terminators.

Suitable chain terminators are both monophenols and monocarboxylic acids. Suitable monophenols are e.g. phenol, p-chlorophenol, p-tert.-butylphenol, cumylphenol or 2,4,6-tribromophenol, as well as long-chain alkylphenols, such as e.g. 4-(1,1,3,3-tetramethylbutyl)phenol, or monoalkylphenols or dialkylphenols with a total of 8 to 20 C atoms in the alkyl substituents, such as e.g. 3,5-di-tert.-butylphenol, p-tert.-octylphenol, p-dodecylphenol, 2-(3,5-dimethylheptyl)phenol or 4-(3,5-dimethylheptyl)phenol. Suitable monocarboxylic acids are benzoic acid, alkylbenzoic acids and halobenzoic acids.

Preferred chain terminators are phenol, p-tert.-butylphenol, 4-(1,1,3,3-tetramethylbutyl)phenol and cumylphenol.

The amount of chain terminators is preferably between 0.25 and 10 mole %, based on the sum of the bisphenols used in each case.

The polycarbonates that are suitable according to the present invention can be branched in a known manner, preferably by incorporating trifunctional or more than trifunctional branching agents. Suitable branching agents are e.g. those with three or more than three phenolic groups or those with three or more than three carboxylic acid groups.

Suitable branching agents are e.g. phloroglucinol, 4,6-dimethyl-2,4,6-tri-(4-hydroxyphenyl)heptene-2,4,6-dimethyl-2,4,6-tri-(4-hydroxyphenyl)heptane, 1,3,5-tri-(4-hydroxyphenyl)benzene, 1,1,1-tris(4-hydroxyphenyl)ethane, tri-(4-hydroxyphenyl)-phenylmethane, 2,2-bis[4,4-bis(4-hydroxyphenyl)cyclohexyl]propane, 2,4-bis(4-hydroxyphenyl-isopropyl)phenol, 2,6-bis(2-hydroxy-5'-methylbenzyl)-4-methylphenol, 2-(4-hydroxyphenyl)-2-(2,4-dihydroxyphenyl)propane, hexa-(4-(4-hydroxyphenylisopropyl)phenyl)terephthalate, tetra-(4-hydroxyphenyl)methane, tetra-(4-(4-hydroxyphenylisopropyl)phenoxy)methane and 1,4-bis(4',4"-dihydroxytriphenyl)methylbenzene as well as 2,4-dihydroxybenzoic acid, trimesic acid, cyanuric chloride, 3,3-bis(3-methyl-4-hydroxyphenyl)-2-oxo-2,3-dihydroindole, trimesoyl chloride and $\alpha,\alpha',\alpha''$-tris(4-hydroxyphenol)-1,3,5-triisopropylbenzene.

Preferred branching agents are 1,1,1-tris(4-hydroxyphenyl)ethane and 3,3-bis(3-methyl-4-hydroxyphenyl)-2-oxo-2,3-dihydroindole.

The amount of the branching agents optionally to be used is preferably 0.05 mole % to 2 mole %, based on moles of bisphenols used.

The branching agents can, for example, in the case of the production of the polycarbonates by the interfacial polycondensation process, be initially charged together with the bisphenols and the chain terminators in the aqueous alkaline phase, or added in solution in an organic solvent together with the carbonic acid derivatives. In the case of the transesterification process, the branching agents are preferably metered in together with the dihydroxy aromatics or bisphenols.

Catalysts preferably to be used in the production of polycarbonate by the melt transesterification process are the ammonium salts and phosphonium salts known from the literature (cf. e.g. U.S. Pat. No. 3,442,864, JP-A-14742/72, U.S. Pat. No. 5,399,659 and DE-A 19 539 290).

Copolycarbonates can also be used. Copolycarbonates within the meaning of the present invention are in particular polydiorganosiloxane-polycarbonate block copolymers, the weight average molecular weight ($M_w$) of which is preferably 10 000 to 200 000 g/mol, particularly preferably 20 000 to 80 000 g/mol (determined by gel chromatography after previous calibration by light scattering measurement or ultracentrifugation). The content of aromatic carbonate structural units in the polydiorganosiloxane-polycarbonate block copolymers is preferably 75 to 97.5 wt. %, particularly preferably 85 to 97 wt. %. The content of polydiorganosiloxane structural units in the polydiorganosiloxane-polycarbonate block copolymers is preferably 25 to 2.5 wt. %, particularly preferably 15 to 3 wt. %. The polydiorganosiloxane-polycarbonate block copolymers can be produced for example starting from $\alpha,\omega$-bishydroxyaryloxy end group-containing polydiorganosiloxanes with an average degree of polymerisation of preferably $Pn=5$ to 100, particularly preferably $Pn=20$ to 80.

It is possible to admix conventional additives, such as e.g. mould release agents, into the polycarbonates in the melt or to apply them on to the surface. The polycarbonates used preferably already contain mould release agents before compounding with the other components of the moulding compositions according to the present invention.

Component B

Polylactic acid is used as component B. Component B here can contain polylactic acid consisting of L-lactic acid monomers, D-lactic acid monomers or mixtures thereof, the mixing ratios of D- or L-lactic acid with the optical antipodes being between 95:5 and 50:50.

Polylactic acids within the meaning of the present invention are also polymers made from lactic acid and/or lactide and at least one other hydroxycarboxylic acid selected from the group comprising glycolic acid, hydroxybutyric acid, hydroxyvaleric acid, hydroxypentanoic acid, hydroxycaproic acid and hydroxyheptanoic acid, in each case also in enantiomerically pure form or as a mixture of enantiomers, and mixtures thereof. In particular, glycolic acid, 3-hydroxylactic acid, 4-hydroxybutanoic acid, 3-hydroxyvaleric acid or 6-hydroxycaproic acid are used.

The content of lactic acid in the mixtures is preferably at least 50 wt. % and more preferably at least 80 wt. %.

Component B preferably has a glass transition temperature of 60° C. and a melting point of 178° C.

The glass transition temperature is determined in accordance with DIN 53765 at a rate of heating of 20 K with nitrogen protective gas, the glass transition temperature being determined as the point of intersection of the centre line between the extrapolated baselines before and after the glass transition of the measured curve.

The melt mass flow rate of component B is preferably in the range of 1 to 50 g/10 min, more preferably 2-25 g/10 min, particularly preferably 5-20 g/10 min, in each case at 210° C. and 2.16 kg load.

The specific density of component B is preferably in the range of 1.2-1.3 g/cm3, particularly preferably 1.24-1.25 g/cm3.

The weight average molecular weight Mw of component B (determined by gel permeation chromatography with polystyrene standard) is preferably 10,000 to 1,500,000, more preferably 15,000 to 150,000, even more preferably 40,000 to 120,000 and particularly preferably 80,000 to 100,000.

Component C

Component C comprises one or more graft polymers of

C.1 5 to 95, preferably 30 to 90 wt. % of at least one vinyl monomer on

C.2 95 to 5, preferably 70 to 10 wt. % of at least one backbone selected from the group consisting of diene rubbers, EP(D)M rubbers (i.e. those based on ethylene/propylene and optionally diene), acrylate, polyurethane, silicone, silicone acrylate, chloroprene and ethylene/vinyl acetate rubbers.

The backbone C.2 generally has an average particle size ($d_{50}$ value) of 0.05 to 10 µm, preferably 0.1 to 5 µm and particularly preferably 0.2 to 1 µm.

Monomers C.1 are preferably mixtures of

C.1.1 50 to 99 parts by weight vinyl aromatics and/or ring-substituted vinyl aromatics (such as styrene, α-methylstyrene, p-methylstyrene, p-chlorostyrene) and/or (meth)acrylic acid ($C_1$-$C_8$) alkyl esters, such as methyl (meth)acrylate, ethyl (meth)acrylate, and C.1.2 1 to 50 parts by weight vinyl cyanides (unsaturated nitriles such as acrylonitrile and methacrylonitrile) and/or (meth)acrylic acid ($C_1$-$C_8$) alkyl esters, such as methyl methacrylate, n-butyl acrylate, t-butyl acrylate and/or derivatives (such as anhydrides and imides) of unsaturated carboxylic acids, for example maleic anhydride and N-phenylmaleimide.

Preferred monomers C.1.1 are selected from at least one of the monomers styrene, α-methylstyrene and methyl methacrylate; preferred monomers C.1.2 are selected from at least one of the monomers acrylonitrile, maleic anhydride and methyl methacrylate.

The designation of the constituent "(meth)" in brackets for acrylates means the optional presence of this constituent.

Preferred backbones C.2 are silicone acrylate rubbers, diene rubbers (for example based on butadiene and isoprene) or mixtures of diene rubbers. The term diene rubber within the meaning according to the present invention is also to be understood as including copolymers of diene rubbers or mixtures thereof with other copolymerisable monomers (e.g. according to C.1.1 and C.1.2).

The backbones C.2 generally have a glass transition temperature of <10° C., preferably <0° C., particularly preferably <−10° C.

In a particularly preferred embodiment, the monomer C.1 is polymethyl methacrylate (PMMA), in which case the backbone C.2 is also preferably a silicone acrylate rubber.

Particularly preferred polymers C are for example ABS polymers (emulsion, bulk and suspension ABS), as described e.g. in DE-OS 2 035 390 (=U.S. Pat. No. 3,644,574) or in DE-OS 2 248 242 (=GB-PS 1 409 275) and in Ullmanns, Enzyklopädie der Technischen Chemie, vol. 19 (1980), pp. 280 ff.

The gel content of the backbone C.2 is preferably at least 20 wt. %, and in the case of backbones C.2 produced by emulsion polymerisation preferably at least 40 wt. % (measured in toluene).

The graft polymer of components C.1 and C.2 preferably has a core-shell structure, with component C.1 forming the shell (also referred to as skin) and component C.2 forming the core (cf. e.g. Ullmann's Encyclopedia of Industrial Chemistry, VCH-Verlag, Vol. A21, 1992, page 635 and page 656.

The graft copolymers C are produced by free-radical polymerisation, e.g. by emulsion, suspension, solution or bulk polymerisation, preferably by emulsion or bulk polymerisation.

Particularly suitable graft rubbers are also ABS polymers, which are produced by an emulsion polymerisation process by redox initiation with an initiator system of organic hydroperoxide and ascorbic acid according to U.S. Pat. No. 4,937, 285.

Since it is known that, during the graft reaction, the graft monomers are not necessarily grafted completely on to the backbone, graft polymers C according to the present invention also mean those products obtained by (co)polymerisation of the graft monomers in the presence of the backbone and jointly produced during the work-up.

Suitable acrylate rubbers according to C.2 of the polymers C are preferably polymers of alkyl acrylates, optionally with up to 40 wt. %, based on C.2, of other polymerisable, ethylenically unsaturated monomers. The preferred polymerisable acrylates include C1 to C8 alkyl esters, for example methyl, ethyl, butyl, n-octyl and 2-ethylhexyl esters; haloalkyl esters, preferably halogen C1-C8 alkyl esters, such as chloroethyl acrylate, and mixtures of these monomers.

For crosslinking purposes it is possible to copolymerise monomers with more than one polymerisable double bond. Preferred examples of crosslinking monomers are esters of unsaturated monocarboxylic acids with 3 to 8 C atoms and unsaturated monohydric alcohols with 3 to 12 C atoms, or saturated polyols with 2 to 4 OH groups and 2 to 20 C atoms, such as ethylene glycol dimethacrylate, allyl methacrylate; polyunsaturated heterocyclic compounds, such as trivinyl and triallyl cyanurate; polyfunctional vinyl compounds, such as di- and trivinylbenzenes; but also triallyl phosphate and diallyl phthalate. Preferred crosslinking monomers are allyl methacrylate, ethylene glycol dimethacrylate, diallyl phthalate and heterocyclic compounds having at least three ethylenically unsaturated groups. Particularly preferred crosslinking monomers are the cyclic monomers triallyl cyanurate, triallyl isocyanurate, triacryloylhexahydro-s-triazine and triallyl benzenes. The quantity of the crosslinked monomers is preferably 0.02 to 5, in particular 0.05 to 2 wt. %, based on the backbone C.2. In the case of cyclic crosslinking monomers with at least three ethylenically unsaturated groups it is advantageous to limit the quantity to less than 1 wt. % of the backbone B.2.

Preferred "other" polymerisable, ethylenically unsaturated monomers, which may optionally also be used in addition to the acrylic acid esters for the production of the backbone C.2, are e.g. acrylonitrile, styrene, α-methylstyrene, acrylamides, vinyl C1-C6 alkyl ethers, methyl methacrylate and butadiene. Preferred acrylate rubbers as backbone C.2 are emulsion polymers having a gel content of at least 60 wt. %.

Suitable silicone rubbers according to C.2 can be produced by emulsion polymerisation, as described for example in U.S. Pat. Nos. 2,891,920 and 3,294,725. Other suitable backbones according to B.2 are silicone rubbers with graft-linking points, as described in DE-OS 3 704 657, DE-OS 3 704 655, DE-OS 3 631 540 and DE-OS 3 631 539.

As backbones C.2, silicone acrylate rubbers are also suitable according to the present invention. These silicone acrylate rubbers are composite rubbers with graft-linking points containing 10-90 wt. % silicone rubber fraction and 90 to 10 wt. % polyalkyl (meth)acrylate rubber fraction, the two aforesaid rubber components in the composite rubber interpenetrating one another so that it is substantially impossible to separate them from one another. If the proportion of the silicone rubber component in the composite rubber is too high, the finished resin compositions have disadvantageous surface properties and impaired pigmentability. If, on the other hand, the proportion of the polyalkyl (meth)acrylate rubber component in the composite rubber is too high, the impact resistance of the finished resin composition is disadvantageously affected. Silicone acrylate rubbers are known and are described for example in U.S. Pat. No. 5,807,914, EP 430134 and U.S. Pat. No. 4,888,388. It is preferred to use a graft polymer with C.1 methyl methacrylate and C.2 silicone acrylate composite rubber produced by emulsion polymerisation.

The gel content of the backbone C.2 is determined at 25° C. in a suitable solvent (M. Hoffmann, H. Kromer, R. Kuhn, Polymeranalytik I and II, Georg Thieme-Verlag, Stuttgart 1977).

The average particle size d50 is the diameter above and below which 50 wt. % of the particles lie. It can be determined by ultracentrifuge measurement (W. Scholtan, H. Lange, Kolloid, Z. and Z. Polymere 250 (1972), 782-1796).

Component D

Within the meaning of the present invention, the salt of a phosphinic acid (component D) is to be understood as the salt of a phosphinic acid with any metal cation. Mixtures of salts which differ in their metal cation can also be used. The metal cations are the cations of metals of the 1st main group (alkali metals, preferably $Li^+$, $Na^+$, $K^+$), the 2nd main group (alkaline earth metals; preferably $Mg^{2+}$, $Ca^{2+}$, $Sr^{2+}$, $Ba^{2+}$, particularly preferably $Ca^{2+}$) or the 3rd main group (elements of the boron group; preferably $Al^{3+}$) and/or the 2nd, 7th or 8th subgroups (preferably $Zn^{2+}$, $Mn^{2+}$, $Fe^{2+}$, $Fe^{3+}$) of the periodic table.

Preferably, a salt or a mixture of salts of a phosphinic acid of formula (IV) is used,

where $M^{m+}$ is a metal cation of the 1st main group (alkali metals; m=1), 2nd main group (alkaline earth metals; m=2) or the 3rd main group (m=3) or the 2nd, 7th or 8th subgroup (wherein m signifies an integer from 1 to 6, preferably 1 to 3 and particularly preferably 2 or 3) of the periodic table.

Particularly preferred in formula (IV) are:
for m=1 the metal cations $M^+=Li^+$, $Na^+$, $K^+$,
for m=2 the metal cations $M^{2+}=Mg^{2+}$, $Ca^{2+}$, $Sr^{2+}$, $Ba^{2+}$ and
for m=3 the metal cations $M^{3+}=Al^{3+}$,
most preferably $Ca^{2+}$ (m=2).

In a preferred embodiment, the average particle size $d_{50}$ of the phosphinic acid salt (component D) is less than 80 μm, preferably less than 60 μm, more preferably less than or equal to 50 μm, and greater than 0.02 μm, preferably greater than 1 μm and particularly preferably greater than 5 μm, it being possible to combine each of the upper and lower limits freely with one another. In another preferred embodiment, $d_{50}$ is between 10 μm and 55 μm.

The average particle size $d_{50}$ is the diameter above and below which 50 wt. % of the particles lie. Mixtures of salts which differ in their average particle size $d_{50}$ can also be used.

These requirements of the particle size are each connected with the technical effect that the flame retardant efficiency of the phosphinic acid salt is increased.

The phosphinic acid salt can be used either alone or in combination with other phosphorus-containing flame retardants. The compositions according to the present invention are preferably free from other phosphorus-containing flame retardants, in particular free from phosphorus-containing flame retardants from the group of the organic monomeric and oligomeric phosphoric and phosphonic acid esters, phosphonate amines and phosphazenes.

Component E

Component E comprises one or more thermoplastic vinyl (co)polymers E.1.

Suitable as vinyl (co)polymers E.1 are polymers of at least one monomer from the group of the vinyl aromatics, vinyl cyanides (unsaturated nitriles), (meth)acrylic acid ($C_1$-$C_8$) alkyl esters, unsaturated carboxylic acids and derivatives (such as anhydrides and imides) of unsaturated carboxylic acids. Particularly suitable are (co)polymers of E.1.1 50 to 99, preferably 60 to 80 parts by weight vinyl aromatics and/or ring-substituted vinyl aromatics, such as styrene, α-methylstyrene, p-methylstyrene, p-chlorostyrene) and/or (meth)acrylic acid ($C_1$-$C_8$) alkyl esters, such as methyl methacrylate, ethyl methacrylate), and E.1.2 1 to 50, preferably 20 to 40 parts by weight vinyl cyanides (unsaturated nitriles) such as acrylonitrile and methacrylonitrile and/or (meth)acrylic acid ($C_1$-$C_8$) alkyl esters, such as methyl methacrylate, n-butyl acrylate, t-butyl acrylate, and/or unsaturated carboxylic acids, such as maleic acid, and/or derivatives, such as anhydrides and imides, of unsaturated carboxylic acids, for example maleic anhydride and N-phenylmaleimide).

The vinyl (co)polymers E.1 are resinous, thermoplastic and rubber-free. The copolymer of E.1.1 styrene and E.1.2 acrylonitrile is particularly preferred.

The (co)polymers according to E.1 are known and can be produced by free-radical polymerisation, in particular by emulsion, suspension, solution or bulk polymerisation. The (co)polymers preferably possess average molecular weights Mw (weight average, determined by light scattering or sedimentation) of between 15,000 and 200,000.

Component F

The composition can contain additional commercial additives according to component F), such as flame retardants, e.g. organic phosphates, flame retardant synergists, anti-drip agents (for example compounds from the classes of substances of the fluorinated polyolefins, the silicones and aramid fibres), lubricants and mould release agents (for example pentaerythritol tetrastearate), nucleating agents, stabilisers, antistatic agents (for example conductive carbon blacks, carbon fibres, carbon nanotubes and organic antistatic agents such as polyalkylene ethers, alkyl sulfonates or polyamide-containing polymers), acids, fillers and reinforcing materials (for example glass or carbon fibres, mica, kaolin, talc, $CaCO_3$ and glass flakes) as well as dyes and pigments. The fluorinated polyolefins are preferably used in the form of a coagulated mixture of emulsions of fluorinated polyolefins with emulsions of a vinyl (co)polymer E.1, particularly preferably with emulsions of a copolymer based on styrene-acrylonitrile.

In a particularly preferred embodiment the composition is free from other flame retardants.

Mould release agents, stabilisers, anti-drip agents and dyes and pigments are particularly preferably used as additives, where carbon fibres and carbon nanotubes do not represent dyes and pigments within the meaning of the present invention.

Production and Testing of the Moulding Compositions

The thermoplastic moulding compositions according to the present invention are produced by mixing the respective components in a known manner and melt-compounding and melt-extruding them at temperatures of 240° C. to 300° C. in conventional equipment such as internal mixers, extruders and twin-screw extruders.

The mixing of the individual components can take place in a known manner either successively or simultaneously, and either at about 20° C. (room temperature) or at a higher temperature.

The present invention also provides processes for the production of the moulding compositions and the use of the moulding compositions for the production of mouldings as well as the moulded parts themselves.

The moulding compositions according to the present invention can be used for the production of all kinds of mouldings. These can be produced by injection moulding, extrusion and blow-moulding processes. Another form of processing is the production of mouldings by thermoforming from previously produced sheets or films.

Examples of these mouldings are films, profiles, all kinds of housing parts, e.g. for domestic appliances, such as television sets, juice presses, coffee machines, mixers; for office machinery, such as monitors, flat screens, notebooks, printers, copiers; sheets, pipes, electrical installation ducts, windows, doors and other profiles for the construction sector (interior fittings and exterior applications) as well as electrical and electronic parts such as switches, plugs and sockets as well as body and interior components for commercial vehicles, especially for the automotive sector.

In addition, the moulding compositions according to the present invention can also be used for example for the production of the following mouldings or moulded parts: interior fittings for rail vehicles, ships, aircraft, buses and other motor vehicles, housings for electrical equipment containing small transformers, housings for equipment for information processing and transfer, housings and claddings for medical equipment, massage equipment and housings therefor, toy vehicles for children, flat wall panels, housings for safety devices and for television sets, thermally insulated transport containers, mouldings for sanitaryware and bathroom fittings, covering grid plates for ventilation openings and housings for garden equipment.

The following examples serve to explain the present invention further.

EXAMPLES

On a twin-screw extruder (ZSK-25) (Werner and Pfleiderer) the feed materials listed in Table 1 are compounded and granulated at a speed of 225 rpm and a throughput of 15 kg/h at a machine temperature of 240° C. (Cp. 1 and 2 and Ex. 1-2) or 270° C. (Ex. 3-6).

The finished granules are processed on an injection-moulding machine to form the appropriate test pieces (melt temperature 260° C., mould temperature 80° C., flow front velocity 40 mm/s).

The following methods were used to characterise the properties of the test pieces:

The notched impact strength was measured in accordance with ISO 180/1A on a specimen injected from one side with dimensions of 80×10×4 mm.

The heat resistance was measured in accordance with DIN ISO 306 (Vicat softening point, Method B with 50 N load and a heating rate of 120 K/h) on a specimen injected from one side with dimensions of 80×10×4 mm.

The fire behaviour and total after-flame time are measured in accordance with UL 94V on bars measuring 127×12.7×1.5 mm.

The stress cracking properties (ESC properties) are investigated on bars measuring 80×10×4 mm. The test medium used in each case is given in Table 1. The test pieces are pre-stretched using a curved template (pre-stretch $\epsilon_x$ x=2.4%) and stored in the test medium at room temperature. The environmental stress cracking properties are evaluated by means of the time to failure ("BR").

Component A:

Linear polycarbonate based on bisphenol A with a relative solution viscosity of ηrel=1.282±0.05 measured in $CH_2Cl_2$ as solvent at 25° C. and at a concentration of 0.5 g/100 ml.

Component B

Polylactic acid with a specific density of 1.24 g/cm$^3$ and a melt-mass flow rate of 5-7 g/10 min (at 210° C./2.16 kg load).

Component C

Component C-1

Impact modifier, graft polymer of

C-1.1 10 wt. % methyl methacrylate on

C-1.2 90 wt. % of a silicone acrylate composite rubber as backbone, wherein the silicone acrylate rubber contains C-1.2.1 46 wt. % silicone rubber and C-1.2.2 54 wt. % polybutyl acrylate rubber, and wherein the two above-mentioned rubber components C-1.2.1 and C-1.2.2 interpenetrate one another in the composite rubber so that it is substantially impossible to separate them from one another.

Component C-2

Impact modifier, graft polymer of

C-2.1 17 wt. % methyl methacrylate on

C-2.2 83 wt. % of a silicone acrylate composite rubber as backbone, wherein the silicone acrylate rubber contains C-2.2.1 11 wt. % silicone rubber and C-2.2.2 89 wt. % polybutyl acrylate rubber, and wherein the two above-mentioned rubber components C-2.2.1 and C-2.2.2 interpenetrate one another in the composite rubber so that it is substantially impossible to separate them from one another.

Component D

Component D-1 (Comparison)

Bisphenol A-based oligophosphate

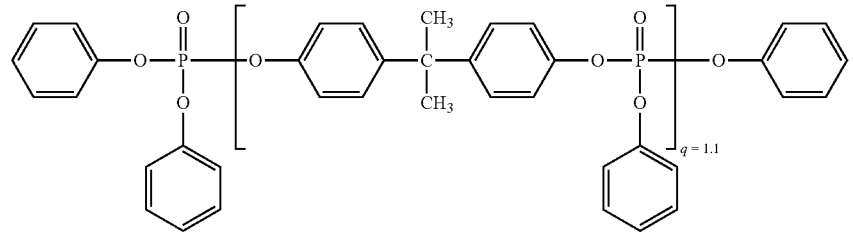

Component D-2

Calcium phosphinate, average particle size $d_{50}$=50 μm.

Component F

Component F-1: Polytetrafluoroethylene powder, CFP 6000 N, Du Pont.

Component F-2: Pentaerythritol tetrastearate

Component F-3: Irganox® B900: mixture of 80 wt. % Irgafos® 168 (tris(2,4-di-tert.-butyl)phenyl phosphite) and 20 wt. % Irganox® 1076 (octadecyl-3-(3,5-di-tert-butyl-4-hydroxyphenyl)propionate) (BASF, Germany)

TABLE 1

| | Cp. 1 | Ex. 1 | Cp. 2 | Ex. 2 | Ex. 3 | Ex. 4 | Ex. 5 | Ex. 6 |
|---|---|---|---|---|---|---|---|---|
| A | 69.3 | 69.3 | 59.3 | 59.3 | 54.3 | 64.3 | 64.3 | 71.8 |
| B | 15 | 15 | 20 | 20 | 25 | 20 | 15 | 15 |
| C-1 | 5 | 5 | 5 | 5 | | | | |
| C-2 | | | | | 5 | 5 | 5 | 5 |
| D-1 | 10 | | 15 | | | | | |
| D-2 | | 10 | | 15 | 15 | 10 | 15 | 7.5 |
| F-1 | 0.4 | 0.4 | 0.4 | 0.4 | 0.4 | 0.4 | 0.4 | 0.4 |
| F-2 | 0.2 | 0.2 | 0.2 | 0.2 | 0.2 | 0.2 | 0.2 | 0.2 |
| F-3 | 0.1 | 0.1 | 0.1 | 0.1 | 0.1 | 0.1 | 0.1 | 0.1 |
| Izod notched impact (RT) [kJ/m$^2$] | 18 | 45 | 12 | 14 | 14 | 46 | 29 | 54 |
| Vicat B120 [° C.] | 106 | 141 | 90 | 136 | 132 | 136 | 139 | 140 |
| Fire behaviour UL 94 V 1.5 mm | V1 | V0 | V0 | V0 | V0 | V0 | V0 | V0 |
| Total after-flame time [s] | 122 | 35 | 50 | 29 | 29 | 57 | 20 | 57 |
| ESC rapeseed oil 2.4%, time to failure [hh:mm] | 01:00 | 04:15 | 01:00 | 04:15 | 03:00 | 05:00 | 05:30 | 37:00 |

It can be seen from Table 1 that only the compositions according to the present invention in Examples 1 to 6 with a combination of polycarbonate, impact modifier and flame retardants based on phosphinate (calcium phosphinate) achieve the object according to the present invention, i.e. exhibit a combination of good performance in the UL94V test with a low after-flame time together with high heat resistance, stress cracking resistance and notched impact strength.

Advantageously, a moulding of the present invention can exhibit at least one of the following properties:
(i) a UL94V test with a low after-flame time of preferably less than 50 s.
(ii) a heat resistance of at least 125° C., and/or
(iii) stress cracking resistance ESC of at least 2 hours, preferably of at least 3 hours.
If not otherwise indicated in the present invention, ESC is measured in rapeseed oil with a pre-stretch $\epsilon_x$ x=2.4%.

In some embodiments all of (i)-(iii) are met.

Also provided in some embodiments is a moulding formed of a composition comprising polycarbonate, an impact modifier and a flame retardant based on phosphinate, which is capable of achieving at least one of the following:
(i) a UL94V test with a low after-flame time of preferably less than 50 s,
(ii) a heat resistance of at least 125° C., and/or
(iii) stress cracking resistance ESC of at least 2 hours, preferably of at least 3 hours).
All documents referred to herein are incorporated by reference in their entireties.

As used in the following claims, terms such as "a", "an", "the" can connote the singular or plural.

The invention claimed is:
1. A composition consisting of
A) 54 to 72 parts by weight, based in each case on the sum of the parts by weight of components A+B+C+D, of an aromatic polycarbonate, wherein the aromatic polycarbonate is a homopolycarbonate based on bisphenol A, a homopolycarbonate based on 1,1-bis-(4-hydroxyphenyl)-3,3,5-trimethylcyclohexane, or a copolycarbonate based on bisphenol A and 1,1-bis-(4-hydroxyphenyl)-3,3,5-trimethylcyclohexane,
B) 15 to 25 parts by weight, based in each case on the sum of the parts by weight of components A+B+C+D, of a polylactic acid,
C) 5 to 9 parts by weight, based in each case on the sum of the parts by weight of components A+B+C+D, of a graft polymer, wherein the graft polymer is selected from the group consisting of an ABS polymer and a graft polymer with silicon acrylate rubber backbone, wherein C) comprises at least one graft polymer of
C.1 5 to 95 wt. %, of at least one vinyl monomer on
C.2 95 to 5 wt. % of at least one backbone selected from the group consisting of butadiene rubbers and silicone acrylate rubbers,
D) 7.5 to 15 parts by weight, based in each case on the sum of the parts by weight of components A+B+C+D, of a salt of a phosphinic acid,
E) 0 to 10 parts by weight, based on the sum of the parts by weight of components A+B+C+D=100 of a vinyl (co) polymer, and
F) 0.7 to 5.0 parts by weight, based in each case on the sum of the parts by weight of components A+B+C+D=100, of at least one additive as component F selected from the group consisting of flame retardants, flame retardant synergists, anti-drip agents, lubricants and mould release agents, nucleating agents, stabilisers, antistatic agents, acids, fillers and reinforcing materials, dyes and pigments,
wherein the sum of the parts by weight of components A+B+C+D in the composition adds up to 100.
2. The composition according to claim 1, wherein the polylactic acid of component B comprises, in addition to lactic acid as monomer, at least one further monomer selected from the group consisting of glycolic acid, hydroxybutyric acid, hydroxyvaleric acid, hydroxypentanoic acid, hydroxycaproic acid and hydroxyheptanoic acid.
3. The composition according to claim 2, wherein the proportion of lactic acid monomers is at least 50 wt. % based on the total weight of the composition.
4. The composition according to claim 1, wherein component B is a polylactic acid with a weight average Mw of 40,000 to 120,000.
5. The composition according to claim 1, wherein D comprises a salt or a mixture of salts of a phosphinic acid of formula (IV),

where
$M^{m+}$ is a metal cation of the 1st main group (alkali metals; m=1), 2nd main group (alkaline earth metals; m=2) or 3rd main group (m=3) or of the 2nd, 7th or 8th subgroup (wherein m signifies an integer from 1 to 6) of the periodic table.
6. The composition according to claim 5 wherein $M^{m+}=Ca^{2+}$ and m=2.

7. The composition according to claim 1, wherein the average particle size d50 of the phosphinic acid salt of component D is not more than 80 μm.

8. A moulding comprising a composition according to claim 1.

9. A method of producing a molding as claimed in claim 8, which comprises mixing A, B, C, D, optionally E, and F to form a mixture and melt-compounding and melt-extruding said mixture at a temperature of from 240° C. to 300° C.

10. A method of claim 9, wherein said method is conducted using an internal mixer, extruder and/or twin-screw extruder.

11. A moulding of claim 8 which exhibits at least one of the following:
   (i) a UL94V test with a after-flame time of less than 50 s,
   (ii) a heat resistance of at least 125° C., and/or
   (iii) stress cracking resistance ESC with of at least 2 hours measured in rapeseed oil with pre-stretch $\epsilon_x$ x=2.4%.

12. A moulding of claim 11 which demonstrates all of said properties (i), (ii), and (iii).

13. The composition according to claim 1, comprising 0.5 to 5.0 parts by weight, based in each case on the sum of the parts by weight of components A+B+C+D, of a vinyl (co) polymer according to component E.

14. A composition of claim 1, wherein
component A is a linear polycarbonate based on bisphenol A, and
component D comprises a salt or a mixture of salts of a phosphinic acid of formula (IV),

where
$M^{m+}$=$Ca^{2+}$ and m=2.

15. A composition of claim 1, wherein C comprises a backbone of silicon acrylate rubber.

16. A composition of claim 1, wherein C comprises a backbone of butadiene rubber.

17. A composition of claim 1, wherein C.2 has an average particle size of 0.2 to 1 microns and a Tg of less than minus 10 degrees C.

* * * * *